UNITED STATES PATENT OFFICE.

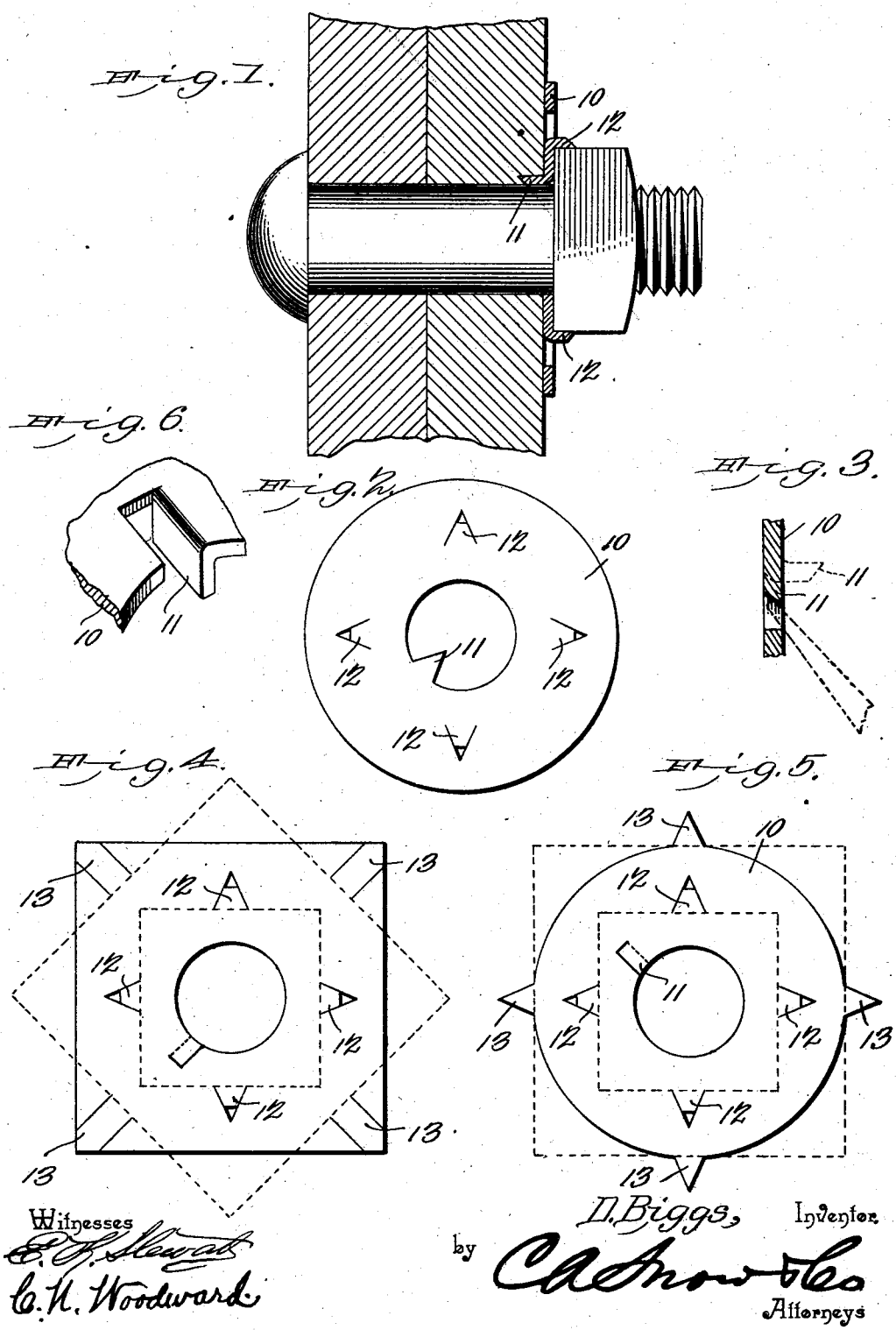

DANIEL BIGGS, OF TERRELL, TEXAS, ASSIGNOR OF ONE-HALF TO ANGUS E. ALEXANDER, OF TERRELL, TEXAS.

NUT-LOCK.

SPECIFICATION forming part of Letters Patent No. 721,140, dated February 24, 1903.

Application filed July 31, 1902. Serial No. 117,844. (No model.)

*To all whom it may concern:*

Be it known that I, DANIEL BIGGS, a citizen of the United States, residing at Terrell, in the county of Kaufman and State of Texas, have invented a new and useful Nut-Lock, of which the following is a specification.

This invention is an improvement in nut-locks, and has for its object the production of a very simple, cheaply-constructed, and easily-applied device which may be employed in connection with wood or metal for holding bolts and nuts in locked engagement and in position to resist any tendency of the nut to move backward from the bolt.

The invention consists in certain novel features of construction, as hereinafter shown and described, and specified in the claim.

In the drawings illustrative of the invention, Figure 1 is a sectional view illustrating the invention applied. Fig. 2 is a plan view of the washer detached. Fig. 3 is an enlarged sectional detail illustrating the construction of a portion of the device more fully. Figs. 4 and 5 illustrate modifications in the construction. Fig. 6 is an enlarged perspective detail illustrating the modification shown in Figs. 4 and 5.

The device comprises a washer (represented at 10) which may be of any desired shape to adapt it to the locality where employed and may be round, square, oblong, or other shape; but for the purpose of illustration it is shown round in Figs. 2 and 5 and square in Fig. 4.

The device is applicable for retaining nuts upon any form of bolt, such as railway-joints, axles, and other structures or machinery where nut-locks are required.

The washer 10 is formed with an aperture engaging the bolt and will be formed with one or more tongues 11, cut from the washer material adjacent to the aperture and adapted to be turned downward and engage the wood adjacent to the bolt when the device is employed to hold portions of wood in wooden structures of various kinds or to engage cavities formed for it in the metal adjacent to the bolt when the device is employed for holding metal parts together. These tongues 11 may be formed pointed, as in Fig. 2, or oblong, as in Fig. 5, and any number may be employed; but ordinarily one will be sufficient, as shown.

The function of these tongues is to connect the washer with the surface of the material being held and prevent the washer from turning thereon, which they most effectually do.

In Figs. 4, 5, and 6 the tongue 11 is formed oblong and disposed radially of the bolt, so that it presents its side in the direction of the strain to which it will be subjected when in use, so that the resistance is thereby increased and the efficiency of the device correspondingly increased.

Formed in the washer, between the central aperture and the rim of the washer, are a series of tongues 12, adapted to be turned upward in engagement with the sides of the nut when the latter is placed in position upon the bolt, and thus lock it in place and prevent it from turning backward on the washer. By employing a number of these tongues 12 one or more of the tongues will always be in position to engage the nut, so that the nut will be locked with certainty at any point of its revolution. The tongues 12 are V-shaped, as shown, with the points cut off and the ends of the tongues beveled backward, so that when the tongues are bent down in alinement with the general surface of the washer a cavity is formed with the ends of the tongues undercut to provide for the insertion of a pointed implement with which to raise the tongue into position against the nut, as shown in Fig. 3. This is an important feature of the invention and greatly increases its efficiency by enabling it to be easily operated and adjusted for use. The undercut ends of the tongues greatly aid in the operation, as they provide ready means for the engagement of the implement employed for the purpose of raising the tongues into engagement with the nut.

In operating the device the tongue 12 is first turned downward and the washer placed in position over the bolt before the nut is applied. If the surface upon which the washer is placed be of wood, the nut is threaded upon the bolt and screwed down tight, thereby forcing the tongue into the wood adjacent to the bolt and firmly locking the washer in place and preventing its turning around the bolt. If the surface upon which the washer rests be of metal, a cavity will be previously formed therein to receive the tongue. After the nut is screwed down as tightly as required the tongues 12 will be turned upward in engagement with the nut, as many of the tongues 12 being employed as may be required.

As before stated, the tongues 12 will be turned up as near as possible to the corners of the nut, and by having a plurality of the tongues one or more of them will be sure to be in proper position with relation to the nut no matter what position the latter may occupy. Ordinarily one of the tongues 12 will be sufficient to retain the nut in place; but by having a plurality of the tongues two or more will generally be in position to engage the nut.

The tongues 12 and 11 will generally be sufficient to support the nut and hold it firmly in place; but under some circumstances a stronger gripping means may be required, and in that event the modification shown in Figs. 4, 5 will be employed, which consists in a series of tongues 13, formed extending from the rim of the washer and adapted to be turned downward into engagement with the material upon which the washer rests or turned upward in engagement with the nut when a larger nut than usual is employed, as shown in Fig. 4. When the supplementary tongues 13 are employed upon a circular washer, as shown in Fig. 5, they will be arranged at uniform intervals around its rim and when employed upon a square nut, as shown in Fig. 4, they will generally be arranged at the corners, as shown.

By this simple means a very simple, cheap, and efficient nut-lock is produced which may be applied to any nut without in any manner weakening or disfiguring the bolt or the nut and can be applied instantly to any bolt or nut without changing or affecting them in the least. No weakening slots or cavities will be required in either the nut or the bolt. The washer will preferably be "struck up" from a single piece of preferably malleable material, so that the tongues may be bent to shape without breaking.

The washer is particularly applicable for use in retaining the nuts upon vehicle-axles, as above noted, and in which position it will be particularly valuable, as nut-locks as heretofore constructed have not been adapted for retaining nuts upon axles.

A nut-lock which will be adapted for the purpose of retaining nuts upon axles has long been desired, and the present invention fully meets all the requirements of such a device.

I do not desire to be limited to the exact construction shown in the drawings, as changes in the size, form, proportion, and position and the minor details of construction within the scope of the appended claims may be resorted to without departing from the principle or sacrificing any of the advantages of this invention.

Having thus described my invention, what I claim is—

As a new article of manufacture, a nut-lock comprising a washer having a central aperture adapted to engage the bolt, a tongue extending from the washer and adapted to be bent at right angles thereto to engage a cavity in the material supporting the washer, a plurality of tongues formed in the washer and adapted to be bent upward into engagement with the nut and having their extremities cut off at an inward incline, whereby undercut cavities are formed between the extremities of the tongues and the washer to provide for the engagement of an implement for elevating the tongues into position with relation to the nut, substantially as described.

In testimony that I claim the foregoing as my own I have hereto affixed my signature in the presence of two witnesses.

DANIEL BIGGS.

Witnesses:
J. ELTON BASS,
R. P. COON.